UNITED STATES PATENT OFFICE.

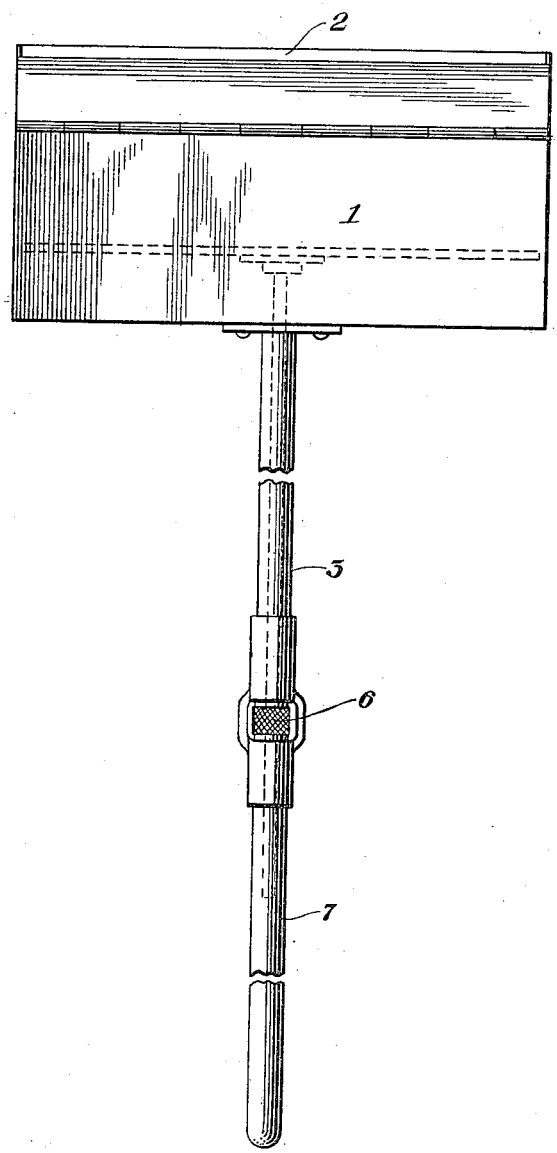
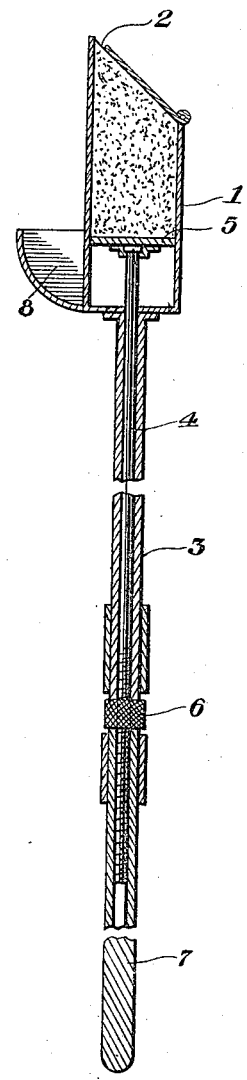

GEORGE JACOB FORCIER, OF CLEVELAND, OHIO.

WALL-PAPER CLEANER.

1,278,626.

Specification of Letters Patent.   Patented Sept. 10, 1918.

Application filed September 29, 1917.   Serial No. 194,028.

*To all whom it may concern:*

Be it known that I, GEORGE J. FORCIER, a citizen of the United States, residing at Cleveland, in the county of Cuyahoga and State of Ohio, have invented new and useful Improvements in Wall-Paper Cleaners, of which the following is a specification.

This invention relates to new and useful improvements in means for cleaning wall paper, and the like, and the principal object of the invention is to provide a receptacle having means therein for slowly forcing the cleaning material from the slot in said receptacle into contact with the wall.

Another object of the invention is to provide a trough connected with the receptacle to receive the material after it leaves the opening.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a front view of the invention.

Fig. 2 is a longitudinal sectional view.

In these figures 1 represents the receptacle made of any suitable material and of any desired shape. As shown the receptacle is of rectangular shape provided with an inclined top which is preferably hinged to the receptacle. At its upper edge this top is cut away to form a slot 2 which extends entirely across the receptacle. Said top is provided with any suitable form of fastening means to hold the same closed against the pressure of the material. A handle 3 is secured to the bottom of the receptacle, said handle being of tubular construction and a rod 4 extends through said handle up through the bottom of the receptacle and has its upper end swiveled to a plate 5, said plate acting as a movable false bottom for the receptacle. The lower end of said rod 4 is screw threaded and receives a screw threaded wheel 6 which bears against a part of the handle 3 whereby when said wheel is rotated the rod 4 is moved longitudinally. 7 indicates a handle extension connected to the handle 3. 8 indicates a trough secured to the lower end of the front side of the receptacle. The rod 4 is provided with a key or rib to prevent the same from rotating when the wheel 6 is turned.

The cleaning material is placed within the receptacle through the movable top thereof so that it rests on the plate 5. Then when the plate 5 is moved upwardly by means of the ring 6 and the rod 4 said material will be forced through the slot 2 and then by moving the receptacle on the wall paper said material will clean the same. As the material wears off it will drop into the trough 8.

It is thought from the foregoing description that the advantages and novel features of my invention will be readily apparent.

I desire it to be understood that I may make slight changes in the construction and in the combination and arrangement of the several parts, provided that such changes fall within the scope of the appended claim.

What I claim is:—

A device of the class described comprising a receptacle having a slot in its top, a plate extending across said receptacle, a rod swiveled to the plate and extending through the bottom of the receptacle, a tubular handle connected with said bottom and through which the rod extends, means for moving said rod longitudinally to raise and lower the plate, and a trough secured to the lower end of the receptacle for receiving the material falling from the device.

In testimony whereof I affix my signature.

GEORGE JACOB FORCIER.

Copies of this patent may be obtained for five cents each, by addressing the "Commissioner of Patents, Washington, D. C."